(12) United States Patent
Peterson

(10) Patent No.: US 10,887,952 B2
(45) Date of Patent: Jan. 5, 2021

(54) VERTICAL TORTILLA COOKING DEVICE

(71) Applicant: Theresa Peterson, Omaha, NE (US)

(72) Inventor: Theresa Peterson, Omaha, NE (US)

(*) Notice: Subject to any disclaimer, the term of this patent is extended or adjusted under 35 U.S.C. 154(b) by 0 days.

(21) Appl. No.: 14/579,658

(22) Filed: Dec. 22, 2014

(65) Prior Publication Data
US 2015/0245420 A1 Aug. 27, 2015

Related U.S. Application Data

(60) Provisional application No. 61/919,549, filed on Dec. 20, 2013.

(51) Int. Cl.
| | | |
|---|---|---|
| *H05B 6/12* | (2006.01) | |
| *A21B 5/02* | (2006.01) | |
| *A47J 37/06* | (2006.01) | |
| *A47J 39/00* | (2006.01) | |

(52) U.S. Cl.
CPC ............ *H05B 6/1245* (2013.01); *A21B 5/02* (2013.01); *A47J 37/0658* (2013.01); *A47J 39/006* (2013.01)

(58) Field of Classification Search
CPC ... A47J 37/0658; A47J 39/006; H05B 6/1245; A21B 5/02
USPC ................................................... 99/358, 426
See application file for complete search history.

(56) References Cited

U.S. PATENT DOCUMENTS

| | | | | |
|---|---|---|---|---|
| 1,633,801 A | * | 6/1927 | Williams | F24H 3/0417 |
| | | | | 219/520 |
| 2,898,437 A | * | 8/1959 | McFarland | A47J 37/041 |
| | | | | 126/21 A |
| 3,608,627 A | * | 9/1971 | Shevlin | A47J 39/006 |
| | | | | 165/206 |
| 3,683,150 A | * | 8/1972 | Kehl | A47J 37/0676 |
| | | | | 219/200 |
| 3,742,174 A | * | 6/1973 | Harnden, Jr. | A47J 27/002 |
| | | | | 219/445.1 |
| 3,790,735 A | * | 2/1974 | Peters, Jr. | H05B 6/129 |
| | | | | 219/398 |
| 3,843,857 A | * | 10/1974 | Cunningham | H05B 6/062 |
| | | | | 219/622 |
| 3,887,253 A | * | 6/1975 | Bridges | A47B 31/00 |
| | | | | 312/236 |
| 3,908,749 A | * | 9/1975 | Williams | A47J 39/006 |
| | | | | 165/61 |

(Continued)

*Primary Examiner* — Eric S Stapleton
(74) *Attorney, Agent, or Firm* — Suiter Swantz pc llo

(57) ABSTRACT

A tortilla cooking device includes induction stages arranged in a substantially vertical configuration, with some of the induction stages including one or more induction elements. The cooking device also includes tortilla pans. A respective tortilla pan is configured for being removably positioned on at least one of the induction stages and formed from a material suitable for magnetic induction based heating. The tortilla pay converts magnetic energy received from at least one induction element of the induction stage to thermal energy. A respective induction stage includes a recessed portion substantially matching a protruding bottom surface of the tortilla pans. The tortilla pans further include a lip structure for retaining one or more materials on a cooking portion of the tortilla pans. The cooking device further includes a casing unit configured to contain the plurality of induction stages arranged in a substantially vertical configuration.

15 Claims, 13 Drawing Sheets

(56) References Cited

U.S. PATENT DOCUMENTS

| | | | | |
|---|---|---|---|---|
| 3,924,100 A * | 12/1975 | Mack | A47B 31/02 | 219/386 |
| 3,956,979 A * | 5/1976 | Coroneos | A47J 37/043 | 99/421 V |
| 4,013,869 A * | 3/1977 | Orts | A47J 27/004 | 126/369 |
| 4,020,310 A * | 4/1977 | Souder, Jr. | H05B 6/06 | 165/919 |
| 4,110,587 A * | 8/1978 | Souder, Jr. | A47J 39/006 | 219/386 |
| 4,173,926 A * | 11/1979 | Brignall | A47J 37/1295 | 294/99.2 |
| 4,285,391 A * | 8/1981 | Bourner | F25D 31/005 | 165/61 |
| 4,380,127 A * | 4/1983 | Roberts | A23L 3/40 | 239/558 |
| 4,629,843 A * | 12/1986 | Kato | H05B 6/1245 | 174/396 |
| 4,776,386 A * | 10/1988 | Meier | A47J 39/006 | 165/48.1 |
| 4,782,745 A * | 11/1988 | George, Jr. | A47J 27/04 | 126/369 |
| 4,908,489 A * | 3/1990 | Panecki | H05B 6/06 | 219/625 |
| 4,994,652 A * | 2/1991 | Wolf | A47J 27/62 | 219/483 |
| 5,070,222 A * | 12/1991 | Yahav | A47J 27/004 | 219/621 |
| 5,182,438 A * | 1/1993 | Oakes | A47J 39/006 | 219/386 |
| 5,235,903 A * | 8/1993 | Tippmann | A21B 3/04 | 126/20 |
| 5,320,030 A * | 6/1994 | Hubbard | A21B 5/03 | 219/385 |
| 5,403,997 A * | 4/1995 | Wimpee | A23L 3/365 | 165/919 |
| 5,457,302 A * | 10/1995 | Amano | F24C 3/126 | 219/492 |
| 5,458,050 A * | 10/1995 | Su | A23B 7/0205 | 219/386 |
| 5,512,733 A * | 4/1996 | Takikawa | H05B 6/062 | 219/620 |
| 5,575,196 A * | 11/1996 | Masel | A47J 37/043 | 99/419 |
| 5,584,231 A * | 12/1996 | Deleon | A47J 37/0611 | 219/492 |
| 5,628,241 A * | 5/1997 | Chavanaz | A47B 31/02 | 165/64 |
| 5,765,471 A * | 6/1998 | Monard | A47J 39/00 | 219/386 |
| 6,116,150 A * | 9/2000 | Greenfield, Jr. | A47J 37/08 | 219/492 |
| D442,423 S * | 5/2001 | Monard | F24C 7/06 | D7/350.4 |
| 6,288,369 B1 * | 9/2001 | Sherman | A47J 37/0635 | 219/405 |
| 6,802,247 B1 * | 10/2004 | Lee | A47J 37/0623 | 219/388 |
| 7,094,991 B2 * | 8/2006 | Naranjo | A47J 37/08 | 219/385 |
| 7,102,109 B2 * | 9/2006 | Niiyama | H05B 6/062 | 219/494 |
| 7,129,449 B2 * | 10/2006 | Tominaga | H05B 6/062 | 219/627 |
| 7,157,674 B2 * | 1/2007 | Miyauchi | H05B 6/062 | 219/518 |
| 7,276,676 B1 * | 10/2007 | Thompson | A47J 36/2483 | 206/541 |
| D629,245 S * | 12/2010 | Lin | F24C 7/06 | D7/338 |
| 7,963,215 B2 * | 6/2011 | Ho | H05B 6/12 | 219/621 |
| 7,989,012 B2 | 8/2011 | Gambino | | |
| 8,217,321 B2 * | 7/2012 | Thimm | H05B 3/68 | 219/412 |
| 8,791,399 B2 * | 7/2014 | Nagamitsu | H05B 6/062 | 219/622 |
| 2004/0054486 A1 * | 3/2004 | Schilling | G05D 23/1917 | 702/99 |
| 2006/0289426 A1 * | 12/2006 | Naranjo | A47J 37/08 | 219/385 |
| 2008/0236405 A1 * | 10/2008 | Lee | F24C 15/105 | 99/331 |
| 2009/0173731 A1 * | 7/2009 | Nagamitsu | H05B 6/062 | 219/622 |
| 2009/0229475 A1 * | 9/2009 | Bally | F24C 7/08 | 99/337 |
| 2010/0206178 A1 * | 8/2010 | Kataoka | H05B 6/062 | 99/331 |
| 2011/0072978 A1 * | 3/2011 | Popescu | A47G 19/14 | 99/288 |

* cited by examiner

VERTICAL TORTILLA COOKING DEVICE

CROSS-REFERENCE TO RELATED APPLICATION

The present application claims the benefit under 35 U.S.C. § 119(e) of U.S. Provisional Application Ser. No. 61/919,549, filed Dec. 20, 2013, entitled VERTICAL TORTILLA COOKING DEVICE, naming Theresa Peterson as an inventor, which is incorporated herein by reference in the entirety.

TECHNICAL FIELD

The present disclosure generally relates to the heating, warming, toasting and of toasting tortillas, and in particular, the heating, warming, toasting and cooking of tortillas in a vertically stacked configuration.

BACKGROUND

In traditional Mexican cooking settings, tortillas are commonly heated or cooked on a Comal, a griddle-like pan, over an open fire. Freshly prepared and still warm tortillas are generally desirable. In the absence of freshly prepared and still warm tortillas, an alternative choice to reheat the tortillas on a pan, or griddle, using a small amount of oil, which serves to enhance the flavor and texture of the tortilla. It is generally known that heating tortillas on a griddle until lightly brown acts to soften the tortillas, making them more pliable. The use of oil acts to carry flavor and serves to hold flavor when eaten by a consumer. The combination of heating and use of oil serves to create a superior dining experience.

It is noted that crisping tortillas on a griddle is significantly different than simply warming them in a steamer. Warming tortillas in a steamer creates a soggy tortilla, which does little to enhance flavor and is ill-suited for many Mexican (and other) dishes. In addition, reheating tortillas in an oven produces a dry, brittle tortilla, similar to a chip, which is not suitable for rolling.

The reheating of tortillas in the presence of oil may be carried out in a single frying pan or single griddle. Preparing tortillas one-at-a-time makes for a long period of preparation. For example, a family of four may require between 4 and 8 tortillas for a meal, which equates to approximately 25-30 minutes preparation time for the tortillas alone. In addition, tortillas prepared in this fashion can generally only be prepared one-at-a-time. Typically, only commercial kitchens have sufficient flat griddle space to prepare multiple tortillas at once.

Therefore, it is desirable to provide a system that overcomes the deficiencies of the previous art, as noted above.

SUMMARY

An apparatus for cooking multiple tortillas is disclosed, in accordance with an illustrative embodiment of the present disclosure. In one illustrative embodiment, the apparatus includes a plurality of induction stages arranged in a substantially vertical configuration. In another illustrative embodiment, at least some of the induction stages include one or more induction elements. In another illustrative embodiment, the apparatus include a plurality of tortilla pans. In another illustrative embodiment, a respective tortilla pan is configured for being removably positioned on at least one of the induction stages. In another illustrative embodiment, a respective tortilla pan is formed from a material suitable for magnetic induction based heating and is configured to convert magnetic energy received from at least one induction element to thermal energy. In another illustrative embodiment, a respective induction stage includes a recessed portion substantially matching a protruding bottom surface of the tortilla pans. In another illustrative embodiment, at least some of the tortilla pans include a lip structure for retaining one or more materials on a cooking portion of the tortilla pans. In another illustrative embodiment, the apparatus includes a casing unit configured to contain the plurality of induction stages arranged in a substantially vertical configuration.

An apparatus for cooking multiple tortillas is disclosed, in accordance with an additional illustrative embodiment of the present disclosure. In one illustrative embodiment, the apparatus includes a plurality of heating plates arranged in a substantially vertical configuration. In another illustrative embodiment, the apparatus includes a plurality of tortilla pans. In another illustrative embodiment, each tortilla pan is configured for being removably positioned on at least one of the heating plates. In another illustrative embodiment, each of the heating plates includes one or more heating elements for heating each of the heating plates to a selected temperature and transferring thermal energy to at least one tortilla pan. In another illustrative embodiment, each heating plate includes a recessed portion substantially matching a protruding bottom surface of the each of the tortilla pans. In another illustrative embodiment, at least some of the tortilla pans include a lip structure for retaining one or more materials on a cooking portion of the tortilla pans. In another illustrative embodiment, the apparatus includes a casing unit configured to encompass the plurality of heating plates arranged in a substantially vertical configuration configured to cover at least a portion of an external housing of a mobile device, the casing unit further configured to reversibly mechanically couple to the external housing of the mobile device.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
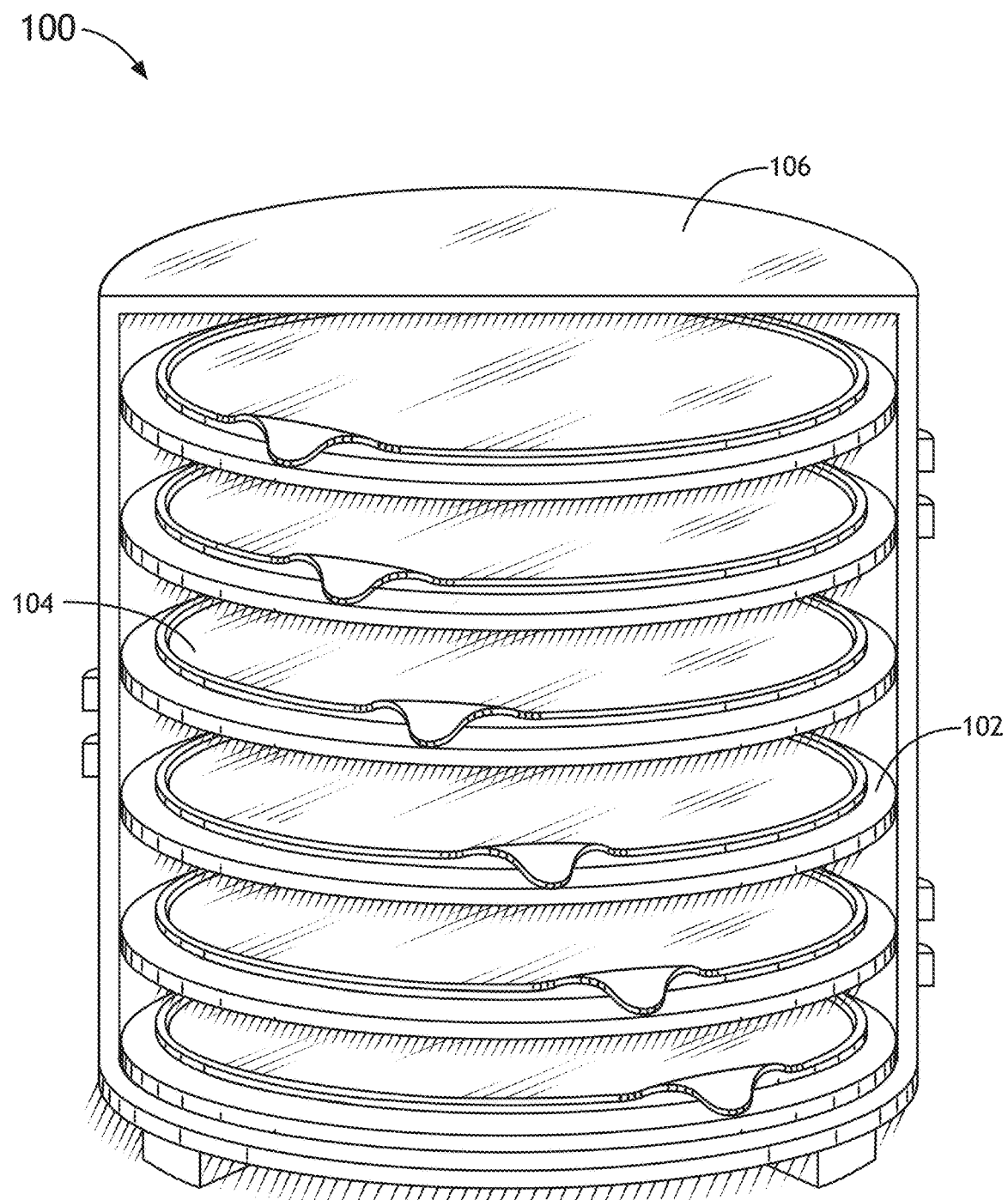
FIG. 1A illustrates a schematic view of a vertical tortilla induction-based cooking device arranged in a stacked configuration, in accordance with an embodiment of this disclosure.

Reference will now be made in detail to the subject matter disclosed, which is illustrated in the accompanying drawings.

Referring generally to FIGS. 1A through 4, a cooking device and method for simultaneously cooking multiple tortillas are described in accordance with the present disclosure.

Embodiments of the present disclosure are directed to cooking (e.g., cooking with oil) multiple tortillas in a vertical, or stacked, configuration. Some embodiments of the present disclosure provide for tortilla cooking or heating via induction-based heating. The induction-based embodiments of the present disclosure are particularly useful as they limit power consumption and provide improved temperature control accuracy. In addition, since the stage needed to secure an associated induction coil may be formed from a non-metal and is not directly heated, the induction-based device of the present disclosure provides for a safer and easier to clean cooking environment. Additional embodiments of the present disclosure provide for tortilla cooking or heating via conduction-based heating. Additional embodiments of the present invention are directed to a modular cooking device, allowing for the cooking capacity of the cooking device to be expanded or reduced based on user's needs.

FIGS. 1A-3E illustrate a tortilla cooking device 100 utilizing induction-based heating, in accordance with one or more embodiments of the present disclosure. In one embodiment, the induction-based tortilla cooking device 100 includes a plurality of induction stages 102. In another embodiment, each induction stage 102 is configured to receive and secure a tortilla pan 104, or griddle. In another embodiment, each induction stage 102 is further configured to heat a corresponding tortilla pan 104 via induction-based thermal energy generation for the purposes of warming or cooking a tortilla utilizing magnetic induction. In another embodiment, the tortilla pans 104 are removable from the cooking device 100. In this regard, a user may insert and later remove one or more of the tortilla pans 104.

For example, a user may insert a given tortilla pan 104 into the cooking device 100 by placing the tortilla pan 104 onto one of the induction stages 102 for the purposes of warming, cooking or toasting the tortilla (not shown) disposed on the tortilla pan 104. The induction stages 102 may then be used to heat (by induction) the tortilla pans 104 and, therefore, the tortillas. Upon heating the tortilla to a selected temperature for a selected time, the user may then remove the tortilla-holding tortilla pan 104 from the cooking device 100. It is noted herein that the removal of the tortilla pans 104 from the cooking device 100, without the removal of the underlying induction stages 102, is particularly advantageous as it provides for more efficient serving (described further herein) as well as more efficient cleaning.

In one embodiment, the cooking device 100 of the present invention is configured in a generally vertically stacked configuration. In this regard, the stages 102/tortilla pans 104 are stacked vertically with a selected spacing, as shown in FIG. 1A. It is noted herein that the number of heating stages 102 and the spacing between them, shown in FIG. 1A, is not limiting and should be interpreted merely as an illustration. It is recognized herein that the tortilla cooking device 100 of the present invention may include any number of induction stages 102/tortilla pan 104 levels as desired.

Figure 1B:
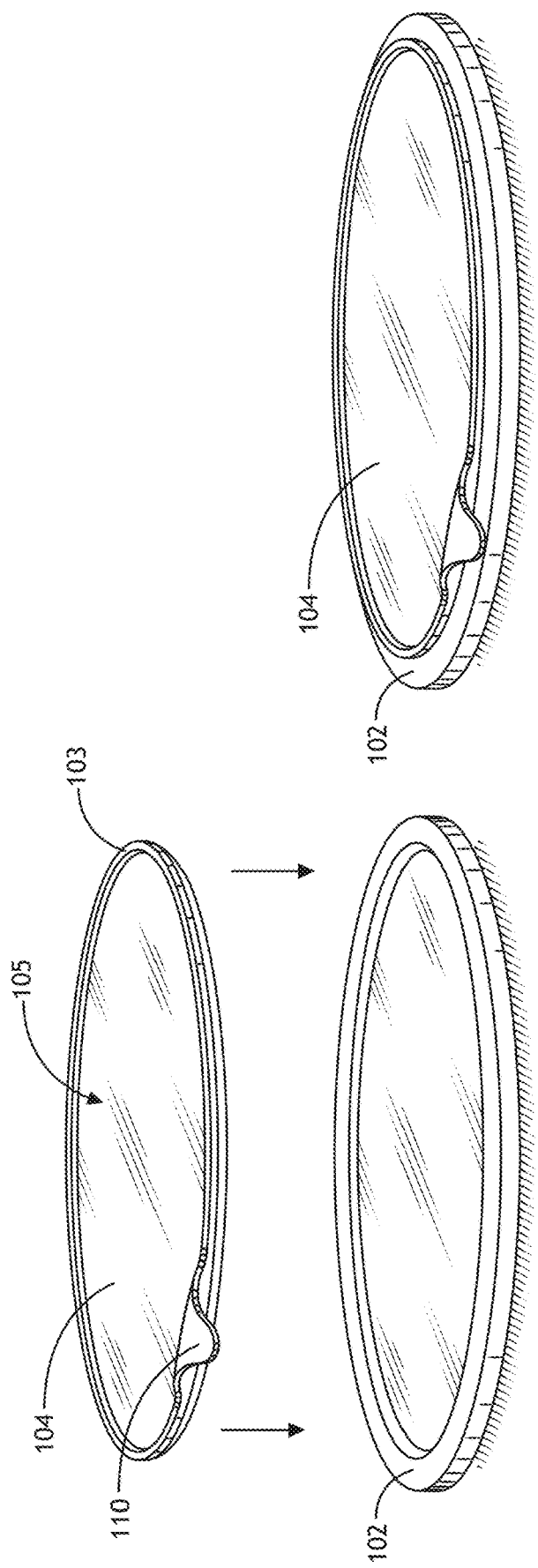
FIG. 1B illustrates a schematic view of an induction stage and tortilla pan of a vertical tortilla induction-based cooking device arranged in a stacked configuration, in accordance with an embodiment of this disclosure.
Figure 1C:
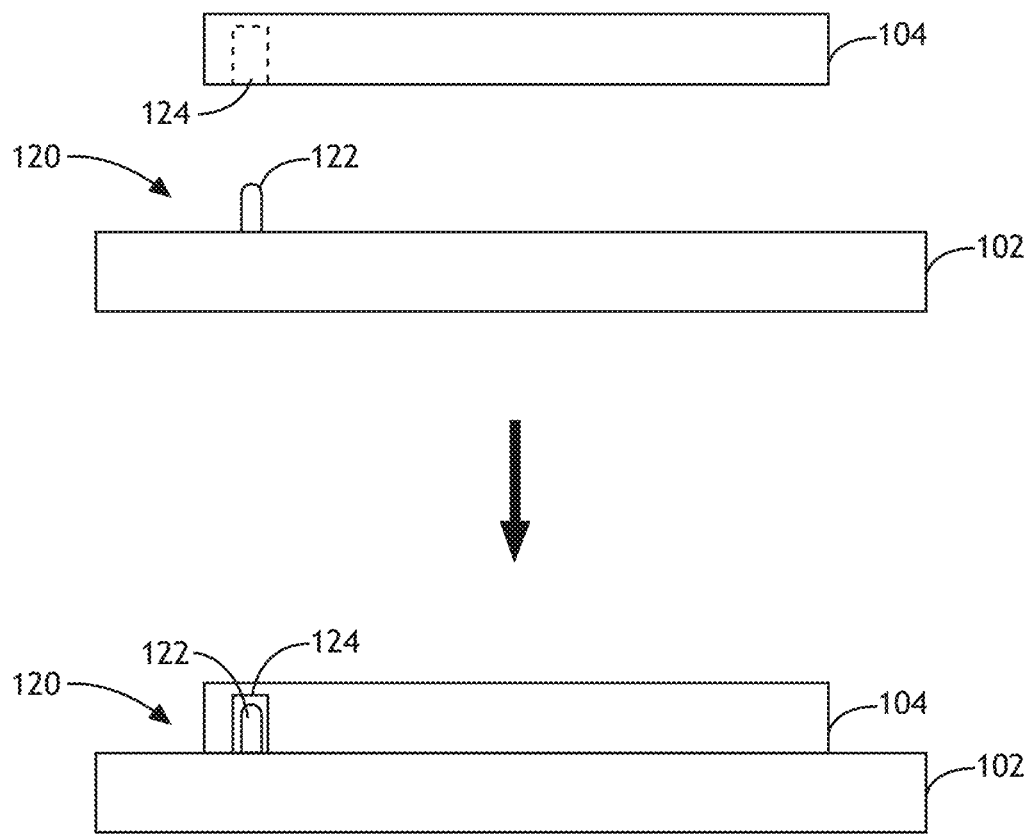
FIG. 1C illustrates a simplified schematic view of a notching system of a vertical tortilla cooking device arranged in a stacked configuration, in accordance with an embodiment of this disclosure.

Referring now to FIG. 1B, an induction stage 102 may include a recessed region 105 matched to the shape of a bottom surface of a corresponding tortilla pan 104. In this regard, a tortilla pan 104 may be placed onto the induction stage 102, whereby the matching recessed region 105 of the induction stage 102 and the bottom surface of the tortilla pan 104 act to secure the tortilla pan 104 in the given induction stage 102. In another embodiment, each of the tortilla pans 104 includes a protruding lip 103 surrounding the outer edge of the flat portion of the tortilla pans 104. In this regard, the lip 103 of a given tortilla pan 104 may serve to retain cooking oil and/or other material (e.g., food debris) disposed on the cooking region of the tortilla pan 104. Such a configuration allows the cooking device 100 to cook tortillas in oil, which is particularly desirable and previously unrealized in such a stacked configuration.

In another embodiment, one or more tortilla pans 104 includes a handle 110 for enabling a user to readily manipulate (e.g., remove, insert, rotate and the like) the tortilla pans 104. In one embodiment, the handle 110 is formed as a molded, cast or machined portion of the tortilla pan 104 such that the handle and cooking portion of the pan 104 are of continuous formation of a single material (e.g., aluminum, anodized aluminum, stainless steel, iron and the like). In another embodiment, the handle 110 is formed from an additional material (e.g., wood, PTFE and the like) and is mechanically coupled to the corresponding tortilla pan 104. In another embodiment, the tortilla pans 104 may be configured such that they do not include a dedicated handle. In this embodiment, a corresponding clasping utensil (e.g., handled clamp, pliers and the like) may be used to insert and remove the tortilla pans 104.

In another embodiment, one or more of the induction stage 102/tortilla pan 104 combinations may include a notching system 120 suitable for rotationally aligning each of the tortilla pans 104 with the corresponding induction stages 102. In addition, the notching system may allow for the tortilla pans 104 to be rotationally aligned with respect to one another. For example, the notching system 120 may include a female groove 124 formed in the top surface of the induction stage 102 and a male protrusion 122 formed in the bottom surface of tortilla pan 104 and matched to the female groove 124 of the induction stage 102 (or vice versa). In this regard, the male protrusion 122 of the bottom surface of a pan 104 may slot into, or fit into, the groove of the top surface of the corresponding induction stage 102, thereby rotationally aligning and securing the tortilla pan 104. For examples, as shown in FIG. 1A, the notching system may serve to rotationally align each of the tortilla pans 104 such that the handles 110 of the tortilla pans 104 are staggered or rotationally spaced equidistance from one another. It is noted herein that the staggering (or spacing) of the handles of the tortilla pans 104 is desirable (although not required) as it allows easier user access to each of the tortilla pans 104. It is noted herein that the present invention is not limited to the notching configuration depicted in FIG. 1C, which is provided merely for illustrative purposes. It is noted that a variety of notching arrangements may exist to secure and arrange the tortilla pans 104 with respect to the induction stages 102 and each other.

In one embodiment, the tortilla pans 104 are constructed of an appropriate magnetic material suitable for use in an inductive-cooking setting. Those skilled in the art will recognize that there are a number of materials suitable for inductive cooking, with the appropriate selected material based on a variety of parameters, such as temperature resistance, efficiency and cost. For example, the tortilla pans 104 may be formed from a ferromagnetic material. In this regard, the tortilla pans 104 may be formed from one or more ferromagnetic materials (e.g., iron, stainless steel and the like) suitable for coupling with an alternating magnetic field from an underlying induction element 106 (see FIG. 3B below). Those skilled in the art should recognize that such an alternating magnetic field generates a corresponding magnetic flux, which when interacting with the cooking pan 104 formed from a ferromagnetic, or other appropriate material, results in an eddy current in the cooking pans 104. The eddy current then serves to heat the cooking pan 104. It is further noted herein that the various parameters needed to control the cooking or heating of the tortillas may be controlled by controlling the various magnetic field characteristics of the underlying induction stage 102.

Figure 1D:
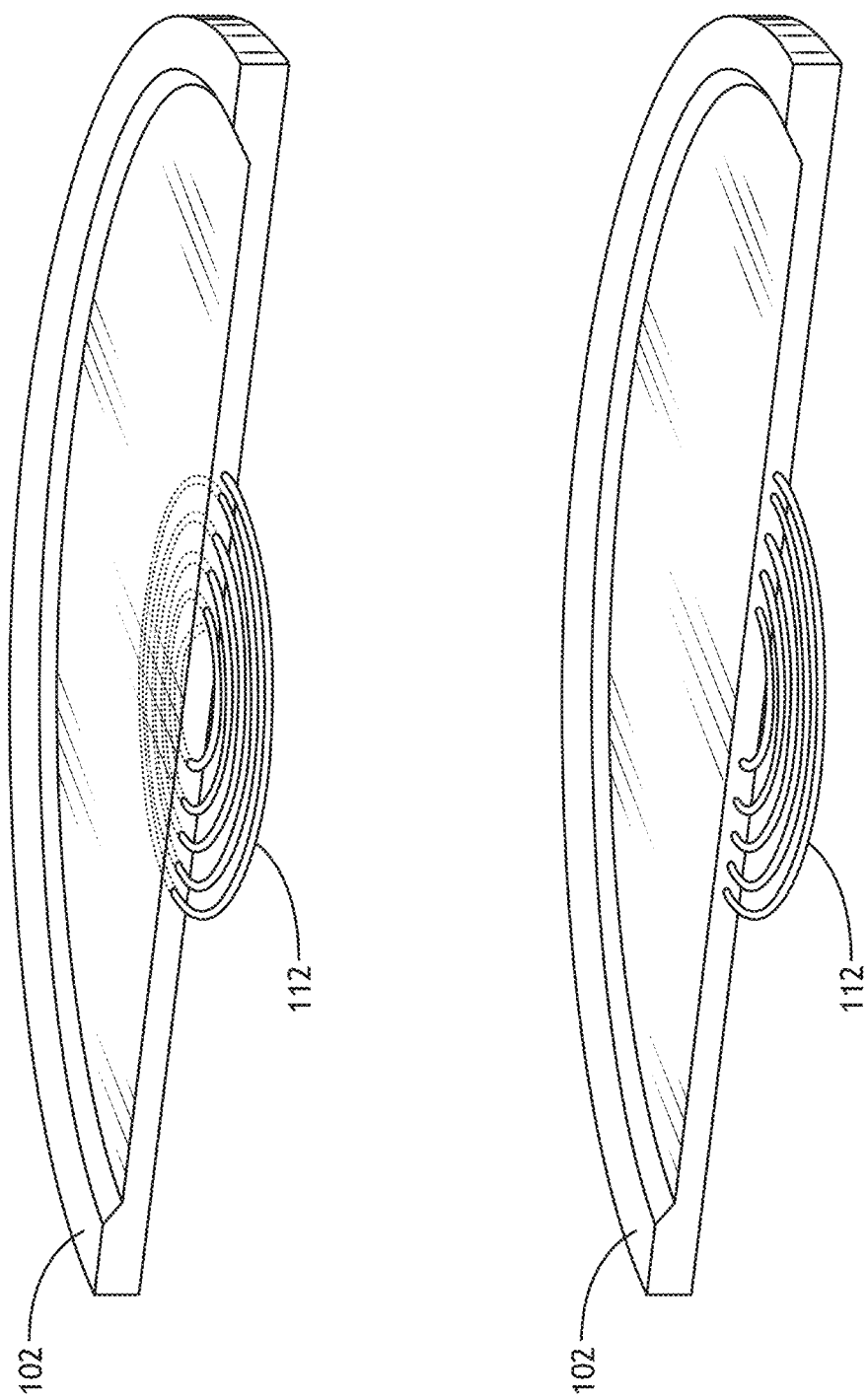
FIG. 1D illustrates a schematic view of an induction stage with an induction coil, in accordance with an embodiment of this disclosure.

FIG. 1D illustrates a single induction stage 102 with an embedded induction element 112, in accordance with one embodiment of the present disclosure. It is noted herein that the induction element 112 may include any induction element known in the art. For example, the induction element 112 may include any induction coil device (e.g., copper coil) known in the art, such as the induction coil depicted in FIG. 1D.

It is further noted herein that the selected induction element 112 may supply sufficient magnetic energy to the tortilla pans 104, which is then converted to thermal energy within the pans 104, and serves raise the temperature of the cooking pan 104 to a selected cooking temperature or heating level. For instance, the induction coil 112 may heat the cooking pan 104 to a temperature in the range of 250° to 450° C.

It is noted that the body of the induction stages 102 may be constructed of any suitable material known in the art. It is noted herein that, due to the use of induction the cooking device 100, the induction stages 102 need not be formed of heat conducting metal. Rather, the induction stages 102 may be formed from any material known in the art suitable for securing, encasing or attaching to an induction coil and withstanding the temperatures reached by the tortilla pans 104. For example, the induction stages 102 may be formed from a non-metal material. For instance, the induction stages 102 may include, but are not limited to, a glass material, a polymer or plastic material suitable for high temperature (e.g., PTFE and the like), a ceramic material and the like. In one embodiment, the induction elements 112 of a respective induction stage 102 may be cast within the volume of the respective induction stage 102. In another embodiment, the induction elements 112 of a respective induction stage 102 may be "sandwiched" between two sub-stage portions (e.g., sheets of material) to form an integrated stage 102/induction element 112 assembly. In another embodiment, the induction elements 112 of a respective induction stage 102 may be mechanically coupled to a bottom side of the respective induction stage 102.

The use of induction-based heating of the tortilla pans 104 provides for a more precise cooking environment in terms of temperature and location of the heat throughout the cooking device 100. The ability to use non-conducting materials to form the body of the induction stages 102 allows the system 100 to more precisely concentrate the thermal energy of the system and limits the amount of heat conducted to the surrounding portions of the assembly of the cooking device 100

Figure 1E:
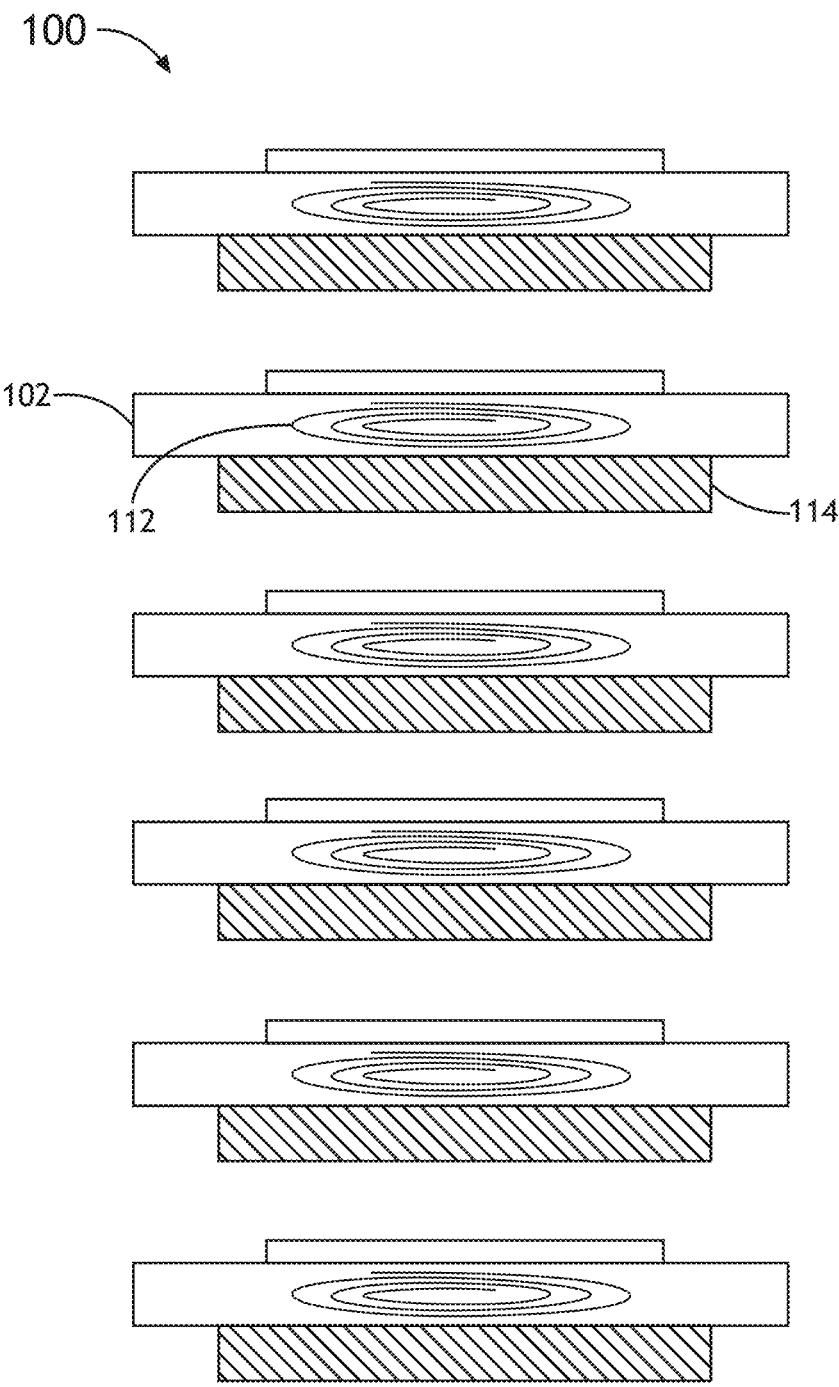
FIG. 1E illustrates a schematic view of a vertical tortilla induction-based cooking device arranged in a stacked configuration with multiple magnetic shield layers, in accordance with an embodiment of this disclosure.

FIG. 1E illustrates the cooking device 100 equipped with one or more magnetic shielding layers 114, in accordance with one or more embodiments of the present disclosure. In one embodiment, a shielding layer 114 may be disposed beneath at least some of induction stages 102. In this regard, the magnetic shield layer 102 of the stages 102 may serve to at least partially shield a given stage from magnetic fields from additional stages beneath the given stage 102. In addition, a given shield layer 102 may serve to at least partially shield induction stages 102 beneath a given induction stage 102 from magnetic fields from the given stage 102. In one embodiment, the magnetic shield layers 114 may serve to isolate the magnetic field components, which serve to heat a tortilla plate 104, to a single induction stage 102 for purposes of control. The magnetic shield layers 114 may be formed from any magnetic shielding material known in the art. For example, the magnetic shield layer may include, but is not limited to, a shielding foil, sheet or plate. For instance, the magnetic shield layers 114 may be formed from GIRON or MU-METAL.

It will be recognized by those skilled in the art that each of the induction elements 112 may be coupled to an electrical power supply by a variety of means. In one embodiment, although not shown, each induction element 112 of the cooking device 100 is electrically coupled to an electrical bus line. For instance, the electrical bus may consist of an electric "spine" running vertically along a portion of the cooking device 100. In another embodiment, the induction elements 112 may be selectively coupled to an electric power source (e.g., 110V or 220V outlet) utilizing an industry standard electric cord and male coupling unit.

Figure 1F:
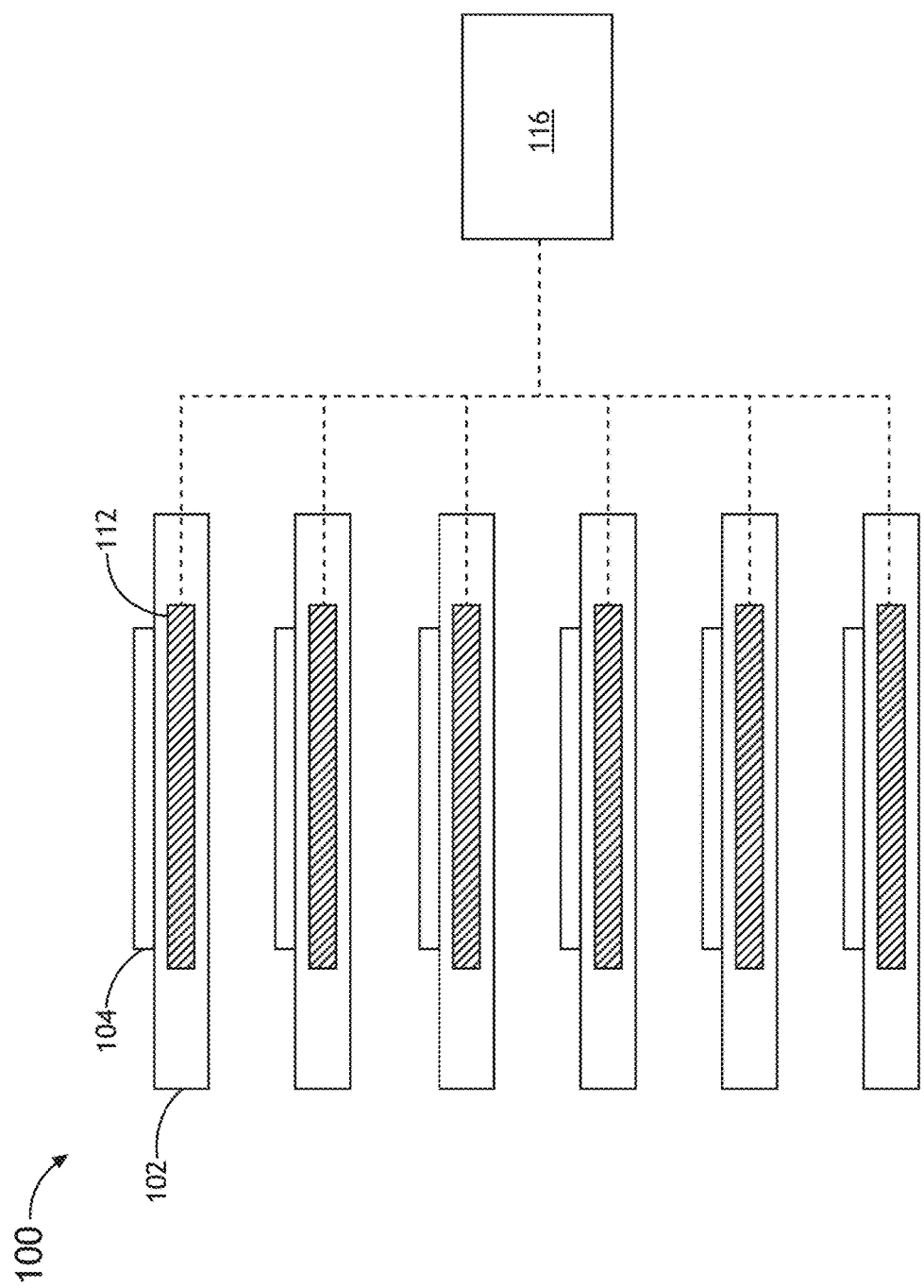
FIG. 1F illustrates a schematic view of a vertical tortilla induction-based cooking device arranged in a stacked configuration equipped with a controller, in accordance with an embodiment of this disclosure.

FIG. 1F illustrates the cooking device 100 equipped with one or more controllers 116, in accordance with one or more embodiments of the present disclosure. In another embodiment, each induction element 112 and the electrical power supply may be coupled to a controller 116 (or control system) suitable for controlling the heating characteristics of the inductions elements 112, collectively and/or individually. In this regard, the controller 116 may include a user interface control (e.g., display and input device) configured to allow the user to turn one or more of the induction elements 112 on or off. For instance, the user interface may include an on/off toggle switch configured to turn all of the induction coils on or off. In another instance, the user interface may include a plurality of toggle switches configured to allow a user to independently turn each of the induction coils on and off. In another embodiment, the user interface may include a temperature control (or heating level) interface configured to allow a user to collectively or independently control the temperature (or preprogrammed heating level) of the cooking pans 104 as provided by the induction coils 112. It is recognized that due to the overall stacked configuration of the pans 104 and induction stages 102, and the corresponding stacked configuration of the enclosed induction coils 112, the power required to maintain a common temperature at each pan 104 level will vary vertically in the cooking device 100. For example, induction stages 102 located at the center of the column of the device 100 may require less electrical power to maintain the same temperature as the stages 102 locate toward the top and/or bottom of the column of the device 100.

It is noted herein that the controller 116 may function as a thermostat device to dynamically adjust the power supplied power to the induction coils 112 in order to maintain a selected temperature profile across the pans 104. Alternatively, a preprogrammed power level may be supplied to each induction stage 102 in order to produce a near constant temperature across the pans 104. In one embodiment, the selected temperature profile may be configured such that each pan 104 is at or near a common temperature. In another embodiment, the selected temperature profile may be configured such that at least some of the pans 104 are at different temperatures. In this regard, the controller 116 may control the electrical power supplied to each of the induction coils 112 of the cooking device 100, whereby the controller 116 may control the on/off status of a given coil 112 as well as the amount of energy transferred from the induction coil 112 to the magnetic tortilla pan 304 disposed on the respective induction stage 102.

In one embodiment, each stage may be equipped with an independent thermal sensor (e.g., thermocouple), which may acquire a temperature reading and feed the temperature data for the respective stage to the controller 116. In this sense, the controller 116 may independently adjust the electrical characteristics of the individual induction coils 112 in order to maintain or establish the temperature of each stage as desired. For example, although not shown, a given induction stage 102 may include a thermal sensor positioned located at or near the area of the stage 102 configure to receive the tortilla pan 104, so that the associated temperature reading is representative of the temperature of the tortilla pan 104. For instance, the thermal sensor may be located at the top surface of the induction stage 102 and located at the center region of the receiving surface of the induction stage 102.

It is noted herein that the induction stages 102 of the cooking device 100 may take on any suitable shape. In one embodiment, as shown in FIGS. 1A-1B, each induction stage 102 may have a generally circular shape. It is noted, however, that the induction stage 102 of the present disclosure are not limited to a circular shape and may take on any other shape known in the art. For example, the induction stage 102 may have a distorted circular shape, an oval shape, a square shape, a rectangular shape or the like.

It is further noted herein that the tortilla pans 104 of the cooking device 100 may also take on any suitable shape. In one embodiment, as shown in FIGS. 1A-1B, each tortilla pan 104 may have a generally circular shape. It is noted, however, that the tortilla pans 104 of the present disclosure are not limited to a circular shape and may take on any other shape known in the art. For example, the tortilla pans 104 may have a distorted circular shape, an oval shape, a square shape, a rectangular shape or the like.

The induction stages 102 and tortilla pans 104 of the present disclosure may be of any size suitable for warming, cooking, frying or toasting of tortillas and like foods. For example, the induction stages 102 and tortilla pans 104 may be, but are not required to be, sized in the range of 6-12 inches. For instance, the induction stages 102 may each have an 8 inch diameter, with the corresponding tortilla pans 104 having a 6 inch diameter. Applicant notes that the absolute size and relative size difference between the induction stage 102 and tortilla pans 104 described above is not limiting and is provided merely for illustrative purposes.

The induction stage 102 and tortilla pans 104 of the present disclosure may be formed by any means known in the art. For example, the induction stages 102 and tortilla pans 104 may be formed via casting, molding, machining, extrusion or any other like fabrication techniques. Further, the induction stages 102 and tortilla pans 104 of the present disclosure may be formed from any suitable heat conducting material known in the art of cooking. For example, the induction stages 102 may be formed, but are not required to be formed, from one or more of the group including stainless steel or cast iron and the like. By way of another example, the tortilla pans 104 may be formed, but are not required to be formed, from at least one of the group including aluminum, stainless steel, cast iron and the like.

As discussed throughout the present disclosure, the cooking device 100 of the present invention may be configured in a generally vertically stack configuration. In this regard, the induction stages 102/tortilla pans 104 are stacked vertically with a selected spacing, as shown in FIG. 1A. While the present disclosure has focused on the implementation of the cooking device 100 in a vertically stacked configuration, this is not a necessary limitation of the present invention. It is contemplated herein that the cooking device 100 of the present invention may be configured in alternative geometrical configurations, such as, but not limited to, a horizontal configuration. For example, although not shown, the induction stages 102/pans 104 of the cooking device 100 of the present disclosure may be configured in a sandwiched configuration, whereby a tortilla may be held vertically by sandwiching the tortilla between two surfaces of the induction stage 102/pan 104 combination. For instance, the induction stage 102/pan configuration 104 may be equipped with two pan 104 surfaces, whereby a tortilla may be placed between the two surfaces and held vertically while cooking.

Figure 1G:
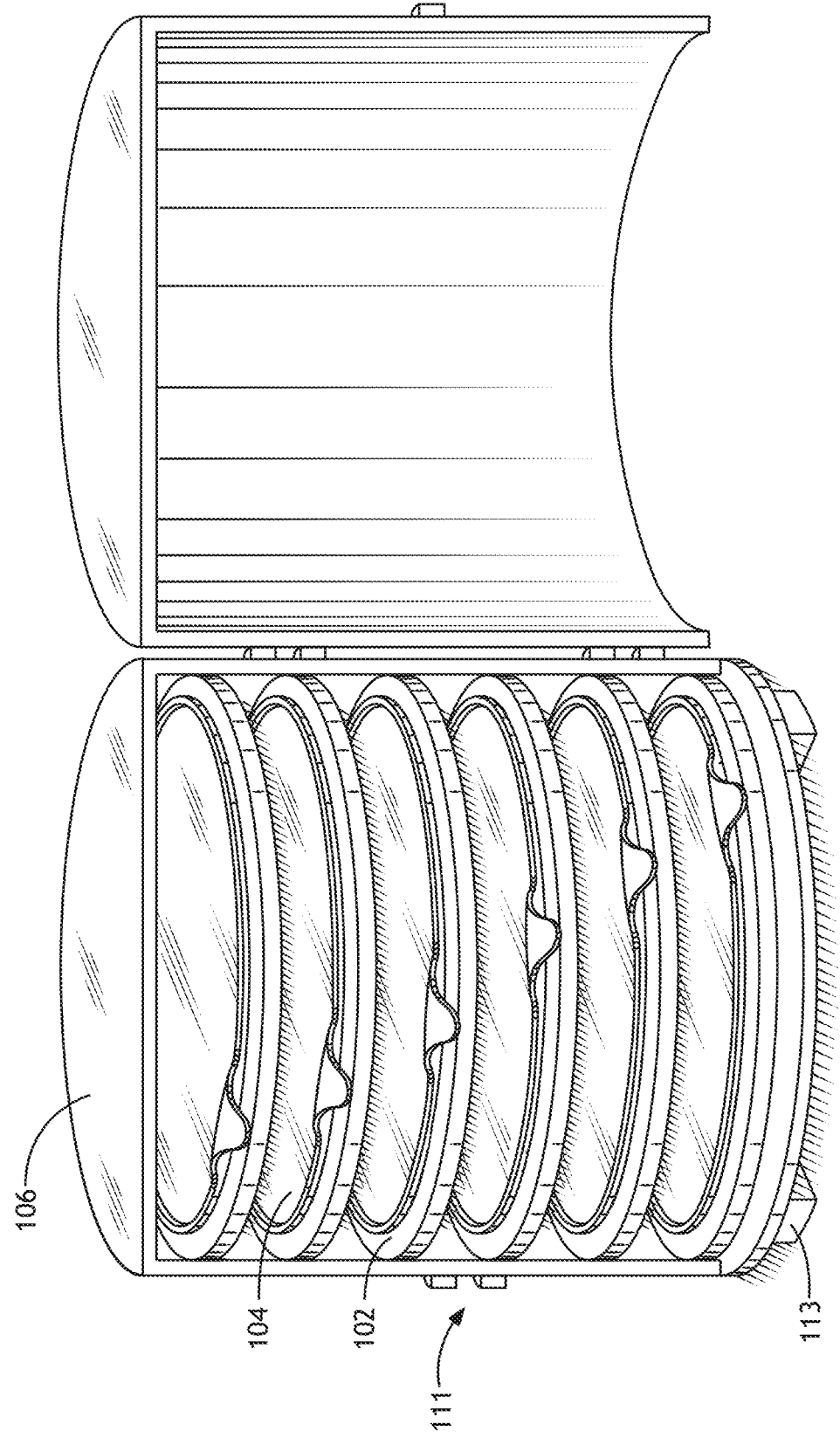
FIGS. 1G-1H illustrate a schematic view of a vertical tortilla induction-based cooking device with a casing unit, in accordance with an embodiment of this disclosure.
Figure 1H:
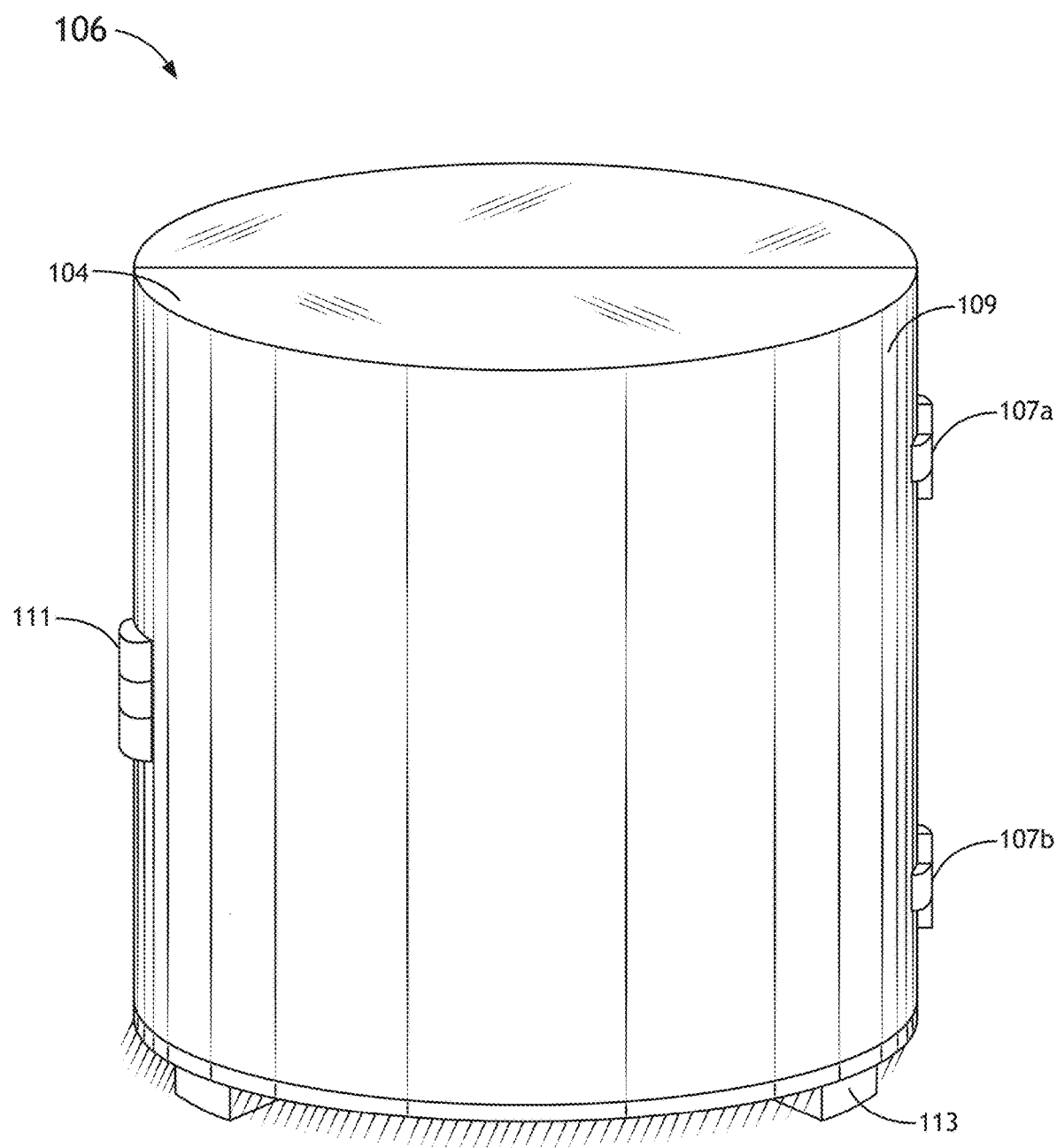

FIGS. 1G and 1H illustrate a casing unit 106 suitable for encasing the induction stage 102s/tortilla pans 104 of the present disclosure. In one embodiment, the casing unit 106 is shaped to conform to the general outer edges of the volume (e.g., cylindrical volume) defined by the outermost edges of the induction stages 102. In one embodiment, the casing unit 106, from a top view, has a generally oval or circular shape, as shown in FIG. 1H. It is noted herein that the casing unit 106 may be formed from any suitable material known in the art. For example, the casing unit 106 may be formed from plastic, metal and the like.

In another embodiment, as shown in FIGS. 1G and 1H, the casing unit 106 includes a hinged door 109. For example, the cooking device 100 may include two or more hinges 107a, 107b, as shown in FIGS. 1G and 1H, configured to allow the door 109 of the casing unit 106 to open and close. In another embodiment, the casing unit 106 includes a latch 111 for securing the door 109. In another embodiment, although not shown, the door 109 is completely removable from the rest of the casing unit 106 and includes one or more latches on both sides of the door 109 for securing the door 109 to the back portion of the casing unit 106.

In one embodiment, as depicted in FIG. 1A, each of the induction stages 102 may be permanently affixed to the interior of the casing unit 106. For example, the induction stages 102 may be permanently affixed to the interior of the casing unit 106 utilizing a frame (not shown), such as, but not limited to, a wire frame disposed within the casing unit casing 106 and configured to secure each of the induction stages 102. In another embodiment, the induction stages 102 are mechanically coupled directly to the casing unit 106 with one or more securing mechanisms (e.g., bolt, screw, rivet and the like).

In another embodiment, the casing unit 106 includes a stand assembly 113. For example, the stand assembly 113 is suitable for elevating the induction stage 102/tortilla pan 104 assembly from a resting surface. For example, the stand assembly 113 may include a plurality of feet suitable for elevating the induction stage 102/tortilla pan 104 assembly from a resting surface by approximately 0.5 to 2 inches.

While the present disclosure has focused on the description of the cooking device 100 in the context of a tortilla cooking environment (i.e., oil cooking, cooking device, heating and the like), it is contemplated herein that the present invention may be extended to additional cooking contexts. In this regard, all or a portion of the induction stages 102/pan assemblies 104 may be used to cook, heat or warm foods other than tortillas. In another embodiment, the pans 104 of the present invention may have side walls that extend beyond the cooking surface 105 of the pans 104 by a selected distance (e.g., 1 inch). In this regard, the pans 104 of the present invention may be used to cook foods different than tortillas, whereby the extended sidewalls of each pan 104 act to retain the food material within the edges of the given pan 104.

Figure 2A:
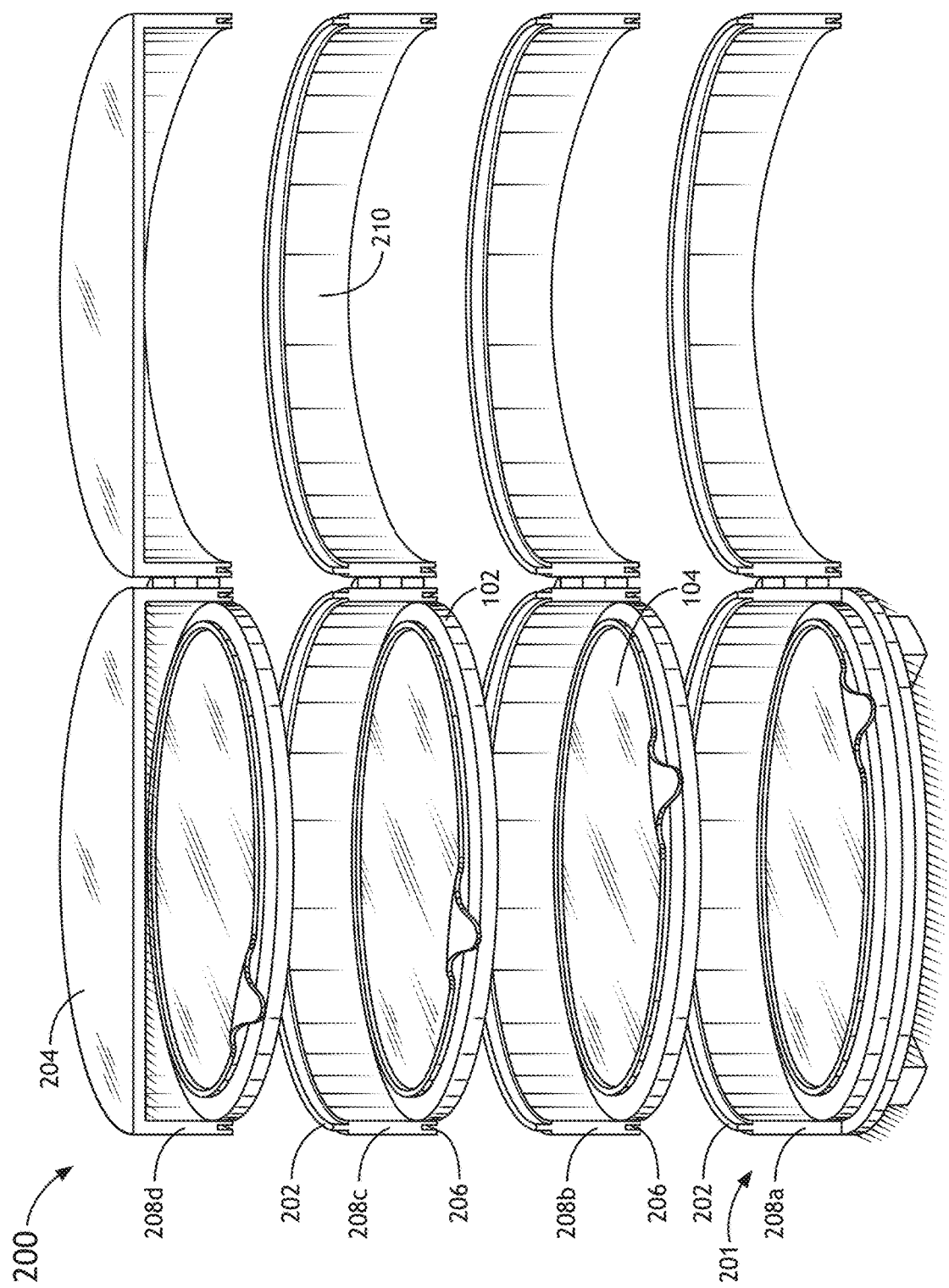
FIGS. 2A-2B illustrate a schematic view of a modular vertical tortilla induction-based cooking device, in accordance with an embodiment of this disclosure.
Figure 2B:
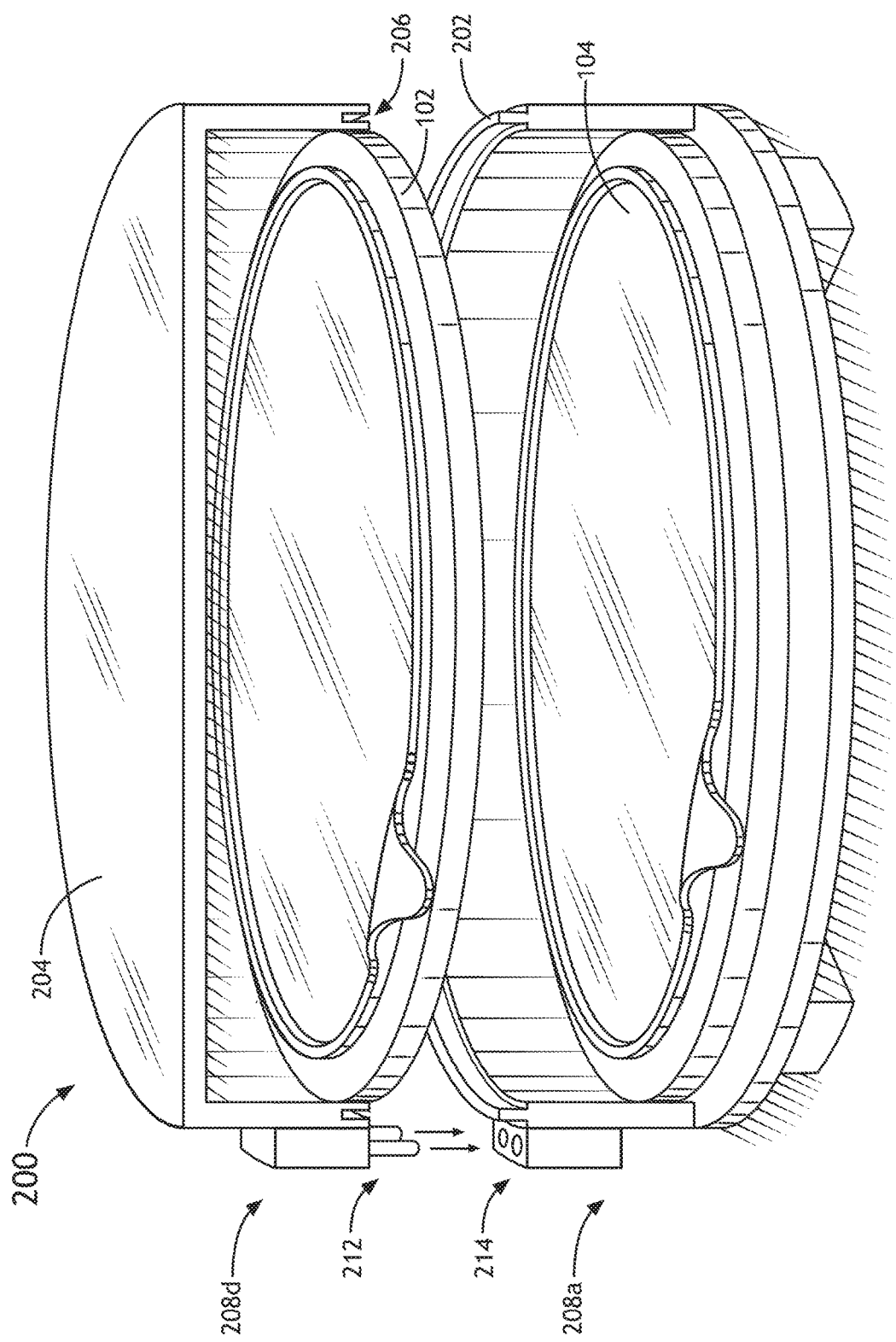

FIGS. 2A and 2B illustrate a modular cooking device 200, in accordance with one or more embodiments of the present disclosure. The modular cooking device 200 is suitable for adding or removing induction stage 102/tortilla pan 104 stages as needed by a user. In one embodiment, a base level 201 may include a male connection element 202, such as, but not limited to, a protruding ridge 202 (i.e., male protrusion) that encircles the top portion of the outer edge of the casing unit 208a of the cooking device 200. In another embodiment, a second casing unit 208b of a second induction stage 102/tortilla pan 104 stage may include a female connection element, such as, but not limited to, a female groove 206 that encircles the bottom portion of the outer edge of the second casing unit 208b. In another embodiment, the female groove 206 of the second induction stage 102/tortilla pan 104 stage is configured to receive the protruding ridge 202 of the first unit 208a. In this regard, the second casing unit 208b may be aligned and secured with respect to the first casing 208a. Likewise, a third casing unit 208c may be stacked onto the top of the second unit 208b and aligned and securing using the protrusion and slot mechanism as described. It is recognized herein that the modular cooking device 200 may include any selected number of induction stage 102/tortilla pan 104/casing unit assemblies. In another embodiment, the modular cooking device 200 may include a top casing unit 208d equipped with a lid 204. In another embodiment, each of the casing unit assemblies 208a-208d may include a hinged door 210.

In another embodiment, as shown in FIG. 2B, each stage may include a dedicated electrical coupling unit. For example, the base stage 208a may include a coupling unit 214, while the top stage 208d includes a coupling unit 212. In this regard, each stage 208a-208d is configured to electrically couple to the one or more (e.g., one or two) induction stage 102/tortilla pan 104/casing unit assemblies adjacent to it. In embodiment, a modular electric bus may be formed, which may then selectively electrically couple the induction stage 102 of each stage to an electrical power source utilizing an electrical control system (e.g., controller 116) housed on either the base stage or top stage. It is further recognized that the means in which each stage of the modular cooking device 200 is mechanically and/or electrically coupled to an adjacent stage or to stages is not limited to the examples provided herein.

Figure 3A:
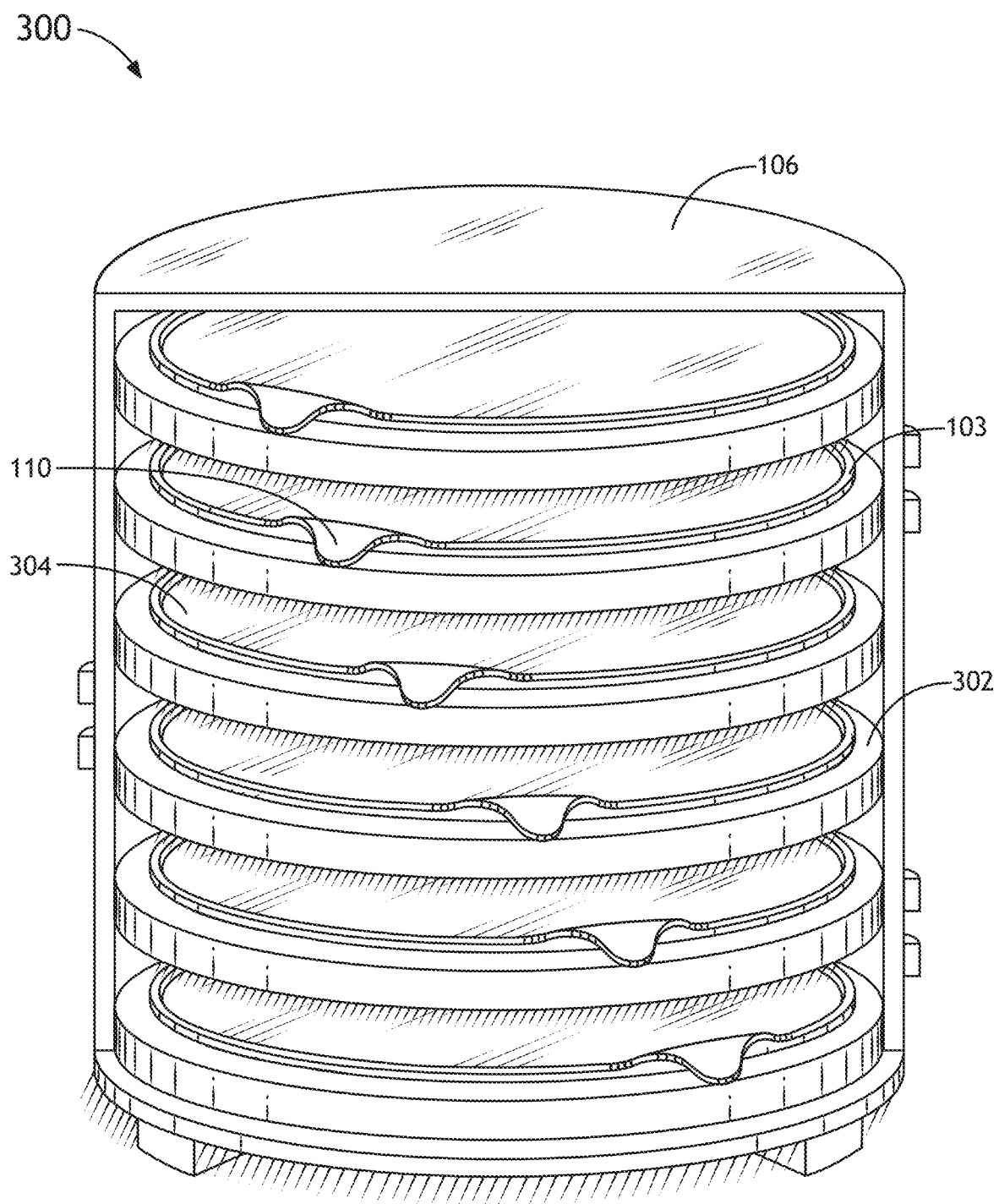
FIGS. 3A-3B illustrate a schematic view of a vertical tortilla conduction-based cooking device arranged in a stacked configuration, in accordance with an embodiment of this disclosure.
Figure 3B:
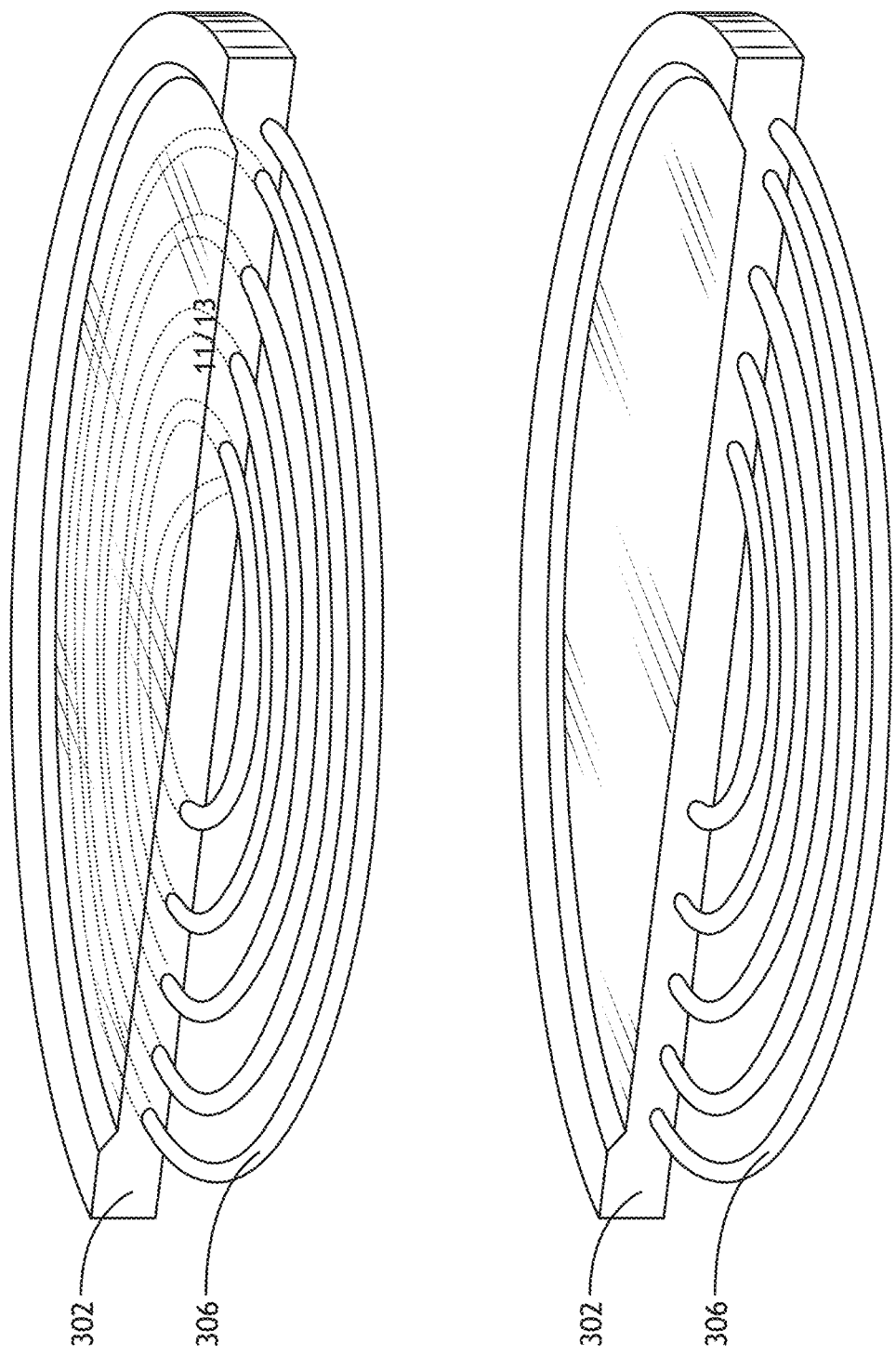

FIGS. 3A-3B illustrate a tortilla cooking device 300 utilizing conduction-based heating, in accordance with one or more embodiments of the present disclosure. In one embodiment, the conduction-based tortilla cooking device 300 includes a plurality of heating plates 302. In another embodiment, each heating plate 302 is configured to receive and secure a tortilla pan 304, or griddle. Each heating plate 302 is further configured to transfer heat to the corresponding tortilla pan 304 via a conduction-based heating process for the purposes of warming or cooking a tortilla, or like food item, disposed on the tortilla pan 304. As previously noted, the tortilla pans 304 are removable from the cooking device 300, whereby a user may insert and later remove each tortilla pan 304 from the cooking device 300.

It is recognized herein that the various examples and embodiments described above with respect to systems 100 and 200 should be interpreted to extend to system 300 unless otherwise noted. For example, the various embodiments with respect to devices 100 and 200 may be altered by replacing the induction stages 102/pans 104 of devices 100 and 200 with the heating plates 302/pans 304.

FIG. 3B illustrates a single heating plate 302 with an embedded heating element 306, in accordance with one embodiment of the present invention. It is noted herein that the heating element 306 may include any heating element known in the art. For example, the heating element 306 may include any heating coil device known in the art, such as the heating coil depicted in FIG. 3B. It is further noted herein that the selected heating element may supply sufficient thermal energy to the mass of the heating plate 302 to raise the temperature of the heating plate to a selected cooking temperature or heating level. For instance, the heating coil 112 may heat the heating plate 302 to a temperature in the range of 250° to 450° C. In one embodiment, each heating plate 302 is formed by casting a heating element 306 in a selected heat conducting material, such as a metal (e.g., aluminum, anodized aluminum and the like). In another embodiment, although not shown, each heating plate 302 is formed by disposing a heating element 306 between two sub-plate portions. For instance, the heating element 306 may be "sandwiched" between two machined sections of a selected heat conductive material (e.g., aluminum, anodized aluminum and the like).

It will be recognized by those skilled in the art that each of the heating elements 112 may be coupled to an electrical power supply by a variety of means. In one embodiment, although not shown, each heating element 306 of the cooking device 100 is electrically coupled to an electrical bus line. For instance, as previously discussed, the electrical bus may consist of an electric spine running vertically along a portion of the cooking device 300. In another embodiment, the heating elements 112 may be selectively coupled to an electric power source (e.g., 110V or 220V outlet) utilizing an industry standard electric cord and male coupling unit.

In another embodiment, each heating element 306 and the electrical power supply may be coupled to controller 116 suitable for controlling the heating elements 112 collectively or individually. In this regard, the control system may include a user interface control configured to allow the user to turn one or more of the heating elements 112 on or off. For instance, the user interface may include an on/off toggle switch configured to turn all of the heating coils 306 on or off. In another instance, the user interface may include a plurality of toggle switches configured to allow a user to independently turn each of the heating coils 306 on and off. In another embodiment, the user interface may include a temperature control (or heating level) interface configured to allow a user to collectively or independently control the temperature (or preprogrammed heating level) of the heating coils 306. It is again recognized that due to the overall stacked configuration of the heating plates 302, and the corresponding stacked configuration of the enclosed heating coils 306, the power required to maintain a common temperature at each heating plate 302 level may vary vertically in the cooking device 300.

Those skilled in the art will again recognize that the controller 116 may serve as a thermostat device to dynamically adjust the supplied power to maintain a selected temperature profile across the heating plates 302. Alternatively, a preprogrammed power level may be supplied to each heating plate 302 in order to produce a near constant temperature across the plates 302. In one embodiment, the selected temperature profile may be configured such that each heating plate 302 is at or near a common temperature. In another embodiment, the selected temperature profile may be configured such that at least some of the heating plates 302 are at different temperatures.

It is again noted herein that the heating plates 302 of the cooking device 300 may take on any suitable shape. For example, the heating plates 302 may have, but are not required to have, a circular shape, a distorted circular shape, an oval shape, a square shape, a rectangular shape or the like. It is further noted herein that the tortilla pans 304 of the cooking device 100 may also take on any suitable shape. For example, the tortilla pans 304 may have, but are not required to have, a circular shape, a distorted circular shape, an oval shape, a square shape, a rectangular shape or the like.

The heating plates 302 and tortilla pans 304 of the present invention may be of any size suitable for warming, cooking or toasting of tortillas and like foods. For example, the heating plates 302 and tortilla pans 304 may be sized in the range of 6-12 inches. For instance, the heating plates 302 may each have an 8 inch diameter, with the corresponding tortilla pans 304 having a 6 inch diameter. Applicant again notes that the absolute size and relative size difference between the heating plates 302 and tortilla pans 304 described above is not limiting and is provided merely for illustrative purposes.

The heating plates 302 and tortilla pans 304 of the present disclosure may be formed by any means known in the art. For example, the heating plates 302 and tortilla pans 304 may be formed via casting, molding, machining, extrusion or any other like fabrication techniques. Further, the heating plates 302 and tortilla pans 304 of the present invention may be formed from any suitable heat conducting material known in the art of cooking. For example, the heating plates 302 may be formed of at least one of the group including aluminum, stainless steel, cast iron and the like. Likewise, the tortilla pans 304 may be formed of at least one of the group including aluminum, stainless steel, cast iron and the like.

As discussed throughout the present disclosure, the cooking device 300 of the present invention may be configured in a generally vertically stack configuration. In this regard, the heating plates 302/tortilla pans 304 are stacked vertically with a selected spacing, as shown in FIG. 3A. While the present disclosure has focused on the implementation of the cooking device 300 in a vertically stacked configuration, this is not a necessary limitation of the present invention. It is contemplated herein that the cooking device 100 of the present invention may be configured in alternative geometrical configurations, such as, but not limited to, a horizontal configuration. For example, although not shown, the heating plates 302/pans 304 of the cooking device 100 of the present invention may be configured in a sandwiched configuration, whereby a tortilla may be held vertically by sandwiching the tortilla between two surfaces of the heating plate 302/pan 304 combination. For instance, the heating plate 302/pan configuration 304 may be equipped with two pan 304 surfaces, whereby a tortilla may be placed between the two surfaces and held vertically while cooking.

While the present disclosure has explicitly discussed the utilization of electric coil-based heating and magnetic induction-based heating, it is further contemplated herein that any heating source known in the art may be utilized in the context of the present invention. For example, the present invention may be implemented in the context of a gas powered heating source, whereby each stage is heated with an independent gas-fed flame.

Figure 4:
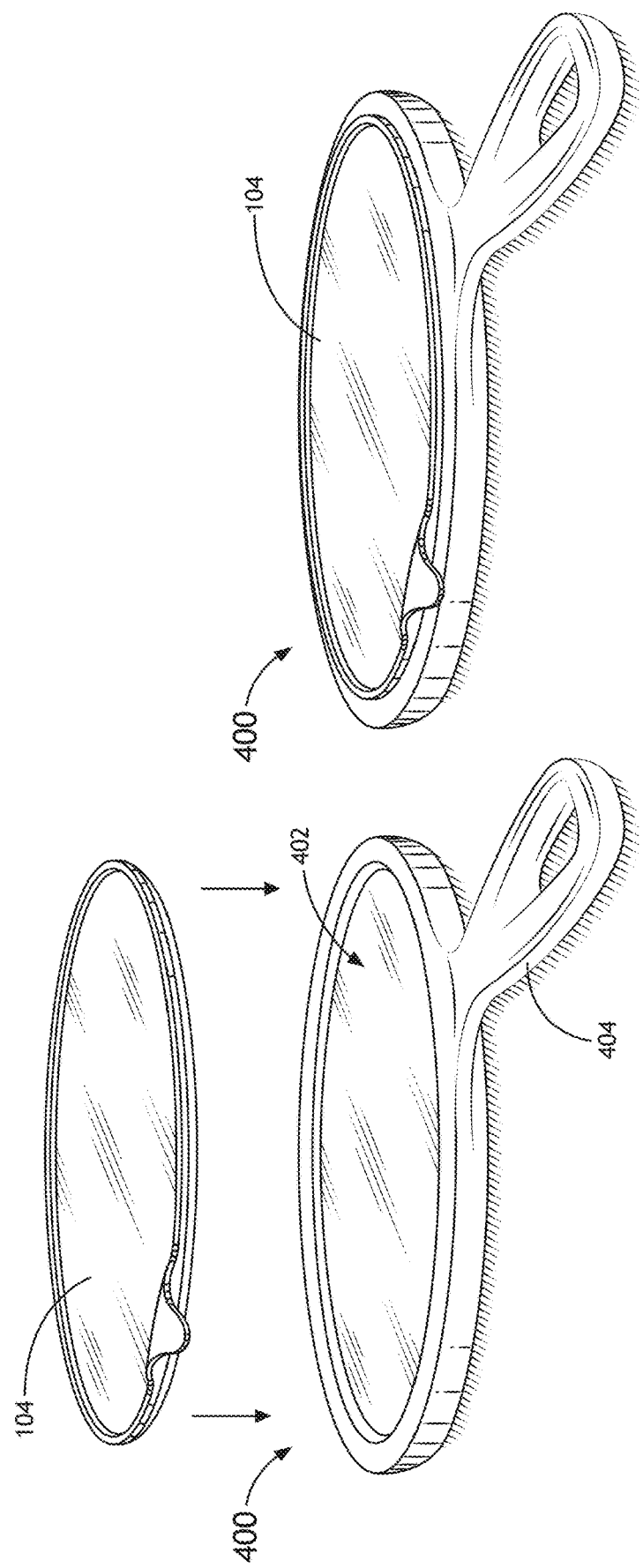
FIG. 4 illustrates a schematic view of a serving tray for carrying a tortilla pan, in accordance with an embodiment of this disclosure.

FIG. 4 illustrates a serving tray 400 suitable for carrying a tortilla pan 104/304 of the present invention. As shown in FIG. 4, the serving tray 400 may include a recessed portion 402 similar to the recessed portion of the induction stages 102/heating plates 302 described previously herein. In this regard, the serving tray 400 may include a recessed region 402 matched to the shape of a bottom surface of the tortilla pans 104/304. In this regard, a tortilla pan 104/304 may be placed onto the serving tray 400, whereby the matching recessed region 402 of the serving tray 400 and the bottom surface of the tortilla pan 104/304 act to secure the tortilla pan 104 in the serving tray 400. In another embodiment, the serving tray 400 may include a handle 404. It is further contemplated, although not shown, that the serving tray 400 may include multiple recessed portions for simultaneous carrying two or more tortilla pans 104/304. It is further recognized that the serving tray 400 does not require a handle.

It is further recognized that the controller 116 may execute one or more steps of any of the various processes described throughout the present disclosure. In this regard, the processes disclosed may be implemented as a set of program instructions. Further, it is understood that the specific order or hierarchy of steps in the processes disclosed are examples of exemplary approaches. Based upon design preferences, it is understood that the specific order or hierarchy of steps in the process(es) can be rearranged while remaining within the scope and spirit of the disclosure.

In one embodiment, the controller 116 includes one or more processors and memory (e.g., non-transitory memory). The one or more processors of controller 116 may include any one or more processing elements known in the art. In general, the term "processor" may be broadly defined to encompass any device having one or more processing elements, which execute program instructions from a non-transitory memory medium. The one or more processors may include any microprocessor-type device configured to execute software algorithms and/or program instructions. In one embodiment, the one or more processors may include any one of a desktop computer, mainframe computer system, workstation, image computer, parallel processor, or other computer system (e.g., networked computer) configured to execute a set of program instructions configured to operate the system 100, as described throughout the present disclosure. It should be recognized that the steps described throughout the present disclosure may be carried out by a single controller or, alternatively, multiple controllers. The memory may include any storage medium known in the art suitable for storing program instructions executable by the associated one or more processors of controller 116. For example, the memory may include, but is not limited to, a read-only memory, a random access memory, a magnetic or optical memory device (e.g., disk), a magnetic tape, a solid state drive and the like. In another embodiment, it is noted herein that the memory is configured to store one or more results from the one or more of the various sub-systems of system 100. In another embodiment, the memory may be located remotely with respect to the physical location of the processors and controller 116. For instance, the one or more processors of controller 116 may access a remote memory (e.g., server), accessible through a network (e.g., internet, intranet and the like) in order to carry out one or more processes of the present disclosure.

The various embodiments described herein may include storing results of one or more steps in a storage medium. The results may include any of the results or indicators (e.g., temperature of one or more stages 102 or 302) described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. An apparatus comprising:
   a plurality of induction stages arranged in a vertical configuration, a respective induction stage including one or more induction elements embedded in a body of the respective single-layer induction stage;
   a plurality of tortilla pans, a respective tortilla pan configured for being removably positioned on at least one of the induction stages, wherein a respective tortilla pan is formed of a material suitable for magnetic induction based heating and configured to convert magnetic energy received from at least one induction element to thermal energy, wherein the body of the respective induction stage includes a recessed portion shaped so as to conform to a protruding bottom surface of a corresponding tortilla pan so as to secure the corresponding tortilla pan on the respective single-layer induction stage, at least some of the tortilla pans including a lip structure for retaining oil on a cooking portion of the tortilla pans, wherein the respective induction stage is configured to cook one or more tortillas in oil contained on the cooking portion of the corresponding tortilla pan;
   a controller, wherein the controller is configured to adjust one or more electrical characteristics of one or more induction elements of the respective induction stage to control the temperature of the induction stage; and
   a vertically stackable modular casing unit configured to contain the plurality of induction stages arranged in a vertical configuration, wherein the vertically stackable module casing unit is configured for expanding a number of induction stages in the apparatus, wherein the modular casing unit includes a first casing unit and at least a second casing unit,
   wherein the first casing unit includes a first induction stage of the plurality of induction stages, a first tortilla pan of the plurality of tortilla pans, and a first hinged door,
   wherein the at least a second casing unit includes at least a second induction stage of the plurality of induction stages, at least a second tortilla pan of the plurality of tortilla pans, and at least a second hinged door,
   wherein the first casing unit includes a ridge encircling the top portion of the first casing unit, wherein the at least a second casing unit includes a groove encircling the bottom portion of the at least a second casing unit and matched to the ridge of the top portion of the first casing unit, wherein the ridge of the first casing unit and the groove of the at least a second casing unit are configured for coupling a bottom portion of the at least a second casing unit to a top portion of the first casing unit,
   wherein the first hinged door includes a section of the ridge encircling the top portion of the first casing unit, wherein the at least a second hinged door includes a section of the groove encircling the bottom portion of the at least a second casing unit, wherein the section of the ridge is matched to the section of the groove such that the first hinged door and the at least a second hinged door open and close simultaneously.

2. The apparatus of claim 1, wherein the one or more induction elements include one or more induction coils.

3. The apparatus of claim 1, wherein the body of the respective induction stage is formed of a non-metal material.

4. The apparatus of claim 3, wherein the non-metal material of the body comprises:
  at least one of a glass material, a plastic material or a ceramic material.

5. The apparatus of claim 1, wherein the body of the respective stage is formed of a ferromagnetic material.

6. The apparatus of claim 1, further comprising:
  a notching system configured to rotationally align two or more of the tortilla pans, wherein each induction stages includes a male protrusion and each tortilla pan includes a female groove matched to the male protrusions of the induction stages, wherein a location of a first male protrusion of a first induction stage is staggered relative to a location of at least a second male protrusion of a second induction stage such that a first handle of the first tortilla pan is staggered relative to a second handle of a second tortilla pan.

7. The apparatus of claim 1, further comprising:
  a plurality of shielding elements, a respective shield element disposed on a bottom side of a first induction stage and configured to shield the first induction stage from a magnetic field contribution from an induction element of a second.

8. The apparatus of claim 1, further comprising:
  one or more serving trays, the one or more serving tray including a recessed region matching the protruding bottom surface of the plurality of tortilla pans.

9. The apparatus of claim 1, further comprising: a plurality of thermal sensors, wherein a respective thermal sensor is disposed at a top surface of the respective induction stage.

10. An apparatus comprising:
  a plurality of heating plates arranged in a vertical configuration;
  a plurality of tortilla pans, each tortilla pan configured for being removably positioned on at least one of the heating plates, each of the heating plates including one or more heating elements for heating each of the heating plates to a temperature and transferring thermal energy to at least one tortilla pan, wherein a body of a respective heating plate includes a recessed portion shaped so as to conform to a protruding bottom surface of a corresponding tortilla pan so as to secure the corresponding tortilla pan in the respective heating plate, at least some of the tortilla pans including a lip structure for retaining oil on a cooking portion of the tortilla pans, wherein the respective heating plate is configured to cook one or more tortillas in oil contained on the cooking portion of the corresponding tortilla pan;
  a controller, wherein the controller is configured to adjust one or more electrical characteristics of one or more heating elements of the respective heating plate to control the temperature of the respective heating plate; and
  a vertically stackable modular casing unit configured to encompass the plurality of heating plates arranged in a vertical configuration, wherein the vertically stackable module casing unit is configured for expanding a number of heating plates in the apparatus, wherein the modular casing unit includes a first casing unit and at least a second casing unit,
  wherein the first casing unit includes a first heating plate of the plurality of heating plates, a first tortilla pan of the plurality of tortilla pans, and a first hinged door,
  wherein the at least a second casing unit includes at least a second heating plate of the plurality of heating plates, at least a second tortilla pan of the plurality of tortilla pans, and at least a second hinged door,
  wherein the first casing unit includes a ridge encircling the top portion of the first casing unit wherein the at least a second casing unit includes a groove encircling the bottom portion of the at least a second casing unit and matched to the ridge of the top portion of the first casing unit, wherein the ridge of the first casing unit and the groove of the at least a second casing unit are configured for coupling a bottom portion of the at least a second casing unit to a top portion of the first casing unit,
  wherein the first hinged door includes a section of the ridge encircling the top portion of the first casing unit, wherein the at least a second hinged door includes a section of the groove encircling the bottom portion of the at least a second casing unit, wherein the section of the ridge is matched to the section of the groove such that the first hinged door and the at least a second hinged door open and close simultaneously.

11. The apparatus of claim 10, wherein at least some of the heating plates include one or more electrical heating coils.

12. The apparatus of claim 10, further comprising:
  a notching system configured to rotationally align two or more of the tortilla pans.

13. The apparatus of claim 10, wherein the one or more heating element is electrically coupled to an electrical bus line, wherein the electrical bus line runs vertically along a portion of the casing unit.

14. The apparatus of claim 10, further comprising: a plurality of thermal sensors, wherein a respective thermal sensor is disposed at a top surface of the respective heating plate.

15. An apparatus comprising:
  a plurality of heating plates arranged in a vertical configuration;
  a plurality of pans, each pan configured for being removably positioned on at least one of the heating plates, each of the heating plates including one or more heating elements for heating each of the heating plates to a temperature and transferring thermal energy to at least one pan, wherein a body of a respective heating plate includes a recessed portion shaped so as to conform to a protruding bottom surface of a corresponding pan so as to secure the corresponding pan in the respective heating plate, at least some of the pans including a lip structure for retaining oil on a cooking portion of the pans, wherein the respective heating plate is configured to cook one or more tortillas in oil contained on the cooking portion of the corresponding pan; and
  a vertically stackable modular casing unit configured to encompass the plurality of heating plates arranged in a vertical configuration, wherein the vertically stackable module casing unit is configured for expanding a number of heating plates in the apparatus, wherein the modular casing unit includes a first casing unit and at least a second casing unit,
  wherein the first casing unit includes a first heating plate of the plurality of heating plates, a first tortilla pan of the plurality of tortilla pans, and a first hinged door,
  wherein the at least a second casing unit includes at least a second heating plate of the plurality of heating plates, at least a second tortilla pan of the plurality of tortilla pans, and at least a second hinged door,
  wherein the first casing unit includes a ridge encircling the top portion of the first casing unit, wherein the at least a second casing unit includes a groove encircling the bottom portion of the at least a second casing unit and matched to the ridge of the top portion of the first casing unit, wherein the ridge of the first casing unit and the groove of the at least a second casing unit are configured for coupling a bottom portion of the at least a second casing unit to a top portion of the first casing unit, wherein the first hinged door includes a section of the ridge encircling the top portion of the first casing unit, wherein the at least a second hinged door includes a section of the groove encircling the bottom portion of the at least a second casing unit, wherein the section of the ridge is matched to the section of the groove such that the first hinged door and the at least a second hinged door open and close simultaneously.

* * * * *